United States Patent
Lee et al.

(10) Patent No.: US 9,736,758 B2
(45) Date of Patent: Aug. 15, 2017

(54) METHOD AND APPARATUS FOR PERFORMING SERVICE-SPECIFIC ACCESS CONTROL IN WIRELESS COMMUNICATION SYSTEM

(71) Applicant: LG ELECTRONICS INC., Seoul (KR)

(72) Inventors: Youngdae Lee, Seoul (KR); Sungjun Park, Seoul (KR); Seungjune Yi, Seoul (KR); Sunghoon Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 50 days.

(21) Appl. No.: 14/427,537

(22) PCT Filed: Sep. 13, 2013

(86) PCT No.: PCT/KR2013/008305
§ 371 (c)(1),
(2) Date: Mar. 11, 2015

(87) PCT Pub. No.: WO2014/042462
PCT Pub. Date: Mar. 20, 2014

(65) Prior Publication Data
US 2015/0223144 A1     Aug. 6, 2015

Related U.S. Application Data

(60) Provisional application No. 61/700,849, filed on Sep. 13, 2012.

(51) Int. Cl.
*H04W 48/02*     (2009.01)
*H04W 4/22*      (2009.01)
*H04W 76/04*     (2009.01)

(52) U.S. Cl.
CPC ............. *H04W 48/02* (2013.01); *H04W 4/22* (2013.01); *H04W 76/046* (2013.01)

(58) Field of Classification Search
CPC ......... H04W 4/00; H04W 4/22; H04W 48/02; H04W 48/06; H04W 76/046
See application file for complete search history.

(56) References Cited

U.S. PATENT DOCUMENTS

2009/0201917 A1*  8/2009  Maes .................... H04L 12/66
                                                          370/352
2010/0159928 A1   6/2010  Wu
(Continued)

FOREIGN PATENT DOCUMENTS

EP       2487962 A1      8/2012
WO   WO 2011043322 A1 *  4/2011  ............ H04W 48/02

OTHER PUBLICATIONS

NTT DoCoMo: "SSAC discussion paper", 3GPP TSG-SA1 #41, S1-082135, Jul. 21-25, 2008, XP050228639.
(Continued)

*Primary Examiner* — Alex Skripnikov
*Assistant Examiner* — Richard Schnell
(74) *Attorney, Agent, or Firm* — Dentons US LLP

(57) ABSTRACT

A method and apparatus for performing service-specific access control in a wireless communication system is provided. A user equipment (UE) acquires different sets of barring information for a voice application, a video application and other application, and decides whether or not access is allowed according to the sets of barring information for the other application if an application except the voice application and the video application is offered.

11 Claims, 6 Drawing Sheets

(56) References Cited

U.S. PATENT DOCUMENTS

| | | | |
|---|---|---|---|
| 2010/0167705 A1* | 7/2010 | Noldus | H04M 7/1235 |
| | | | 455/414.1 |
| 2011/0199898 A1 | 8/2011 | Cho et al. | |
| 2011/0201307 A1 | 8/2011 | Segura | |
| 2012/0023573 A1 | 1/2012 | Shi | |
| 2012/0039171 A1 | 2/2012 | Yamada et al. | |
| 2012/0170503 A1* | 7/2012 | Kelley | H04W 48/06 |
| | | | 370/312 |
| 2012/0244853 A1* | 9/2012 | Iwamura | H04W 48/02 |
| | | | 455/422.1 |
| 2013/0122906 A1* | 5/2013 | Klatt | H04W 48/02 |
| | | | 455/435.1 |
| 2014/0099969 A1* | 4/2014 | Hwang | H04W 48/06 |
| | | | 455/453 |
| 2015/0119060 A1* | 4/2015 | Aoyagi | H04W 48/02 |
| | | | 455/452.1 |

OTHER PUBLICATIONS

NTT DoCoMo: "SSAC Considerations: Probability Factor", 3GPP TSG-SA1 #42, S1-083039, Oct. 13-17, 2008, KP050329801.
3GPP TR 23.898 V2.0.0 (Feb. 2005), 3rd Generation Partnership Project; Technical Specification Group Services and System Aspects; Access Class Barring and Overload Protection; (Release 6), XP050431220.

* cited by examiner

METHOD AND APPARATUS FOR PERFORMING SERVICE-SPECIFIC ACCESS CONTROL IN WIRELESS COMMUNICATION SYSTEM

This application is a 35 U.S.C. §371 National Stage Entry of International Application No. PCT/KR2013/008305 filed Sep. 13, 2013, which claims benefit of and priority to U.S. Provisional Application No. 61/700,849 filed Sep. 13, 2012, each of which is incorporated by reference for all purposes as if fully set forth herein.

BACKGROUND OF THE INVENTION

Field of the Invention

The present invention relates to wireless communications, and more particularly, to a method and apparatus for performing service-specific access control in a wireless communication system.

Related Art

Universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). A long-term evolution (LTE) of UMTS is under discussion by the 3rd generation partnership project (3GPP) that standardized UMTS.

IP multimedia subsystem (IMS) multimedia telephony service (MMTel) is a global standard based on the IMS, offering converged, fixed and mobile real-time multimedia communication using the media capabilities such as voice, real-time video, text, file transfer and sharing of pictures, audio and video clips. With MMTel, users have the capability to add and drop media during a session. It is possible that chat, add voice (for instance mobile VoIP), add another caller, add video, share media and transfer files, and drop any of these can begin without losing or having to end the session.

In an emergency situation, like earthquake or tsunami, degradation of quality of service may be experienced. Degradation in service availability and performance can be accepted in such situations, but mechanisms are desirable to minimize such degradation and maximize the efficiency of the remaining resources. When domain specific access control (DSAC) mechanism was introduced for UMTS, the original motivation was to enable packet-switched (PS) service continuation during congestion in circuit switched (CS) nodes in the case of major disaster like an earthquake or a tsunami. In fact, the use case of DSAC in real UMTS deployment situation has been to apply access control separately on different types of services, such as voice and other PS services. For example, people's psychological behavior is to make a voice call in emergency situations and it is not likely to change. Hence, a mechanism will be needed to separately restrict voice calls and other services.

As an evolved packet system (EPS) is a PS-domain only system, the DSAC does not apply. Therefore, service-specific access control (SSAC) may be applied instead of DSAC. Considering the characteristics of voice and non-voice calls in EPS, requirements of the SSAC could be to restrict the voice calls and non-voice calls separately.

For a normal paid service there are quality of service (QoS) requirements. The provider can choose to shut down the service if the requirements cannot be met. In an emergency situation, the most important thing is to keep communication channels uninterrupted, therefore the provider should preferably allow for a best effort (degradation of) service in preference to shutting the service down. During an emergency situation, there should be a possibility for the service provider also to grant services, give extended credit to subscribers with accounts running empty. Under some circumstances, overload access control may be invoked giving access only to authorities or a predefined set of users.

A method for performing SSAC efficiently may be required.

SUMMARY OF THE INVENTION

The present invention provides a method and apparatus for performing service-specific access control in a wireless communication system. The present invention provides a method for applying service-specific access control (SSAC) to other applications than voice and video services.

In an aspect, a method for performing, by a user equipment (UE), service-specific access control in a wireless communication system is provided. The method includes acquiring different sets of barring information for a voice application, and a video application and other application, deciding whether or not access is allowed according to the sets of barring information for the other application if an application except the voice application and the video application is offered.

The different sets of barring information may be acquired at a radio access control (RRC) layer.

The method may further include forwarding the acquired different sets of barring information from an RRC layer to an upper layer than the RRC layer. The upper layer may be a multimedia telephony service (MMTEL) layer.

The method may further include selecting the sets of barring information for the other application among the different sets of barring information at an upper layer than an RRC layer.

The different sets of barring information may be acquired via a system information block type 2 (SIB2).

The other application may contain at least one of chat communication, text communication, image transfer, file transfer, fax, data.

The voice application may correspond to a voice service over long term evolution (VoLTE).

The voice application, the video application and the other application may correspond to IP multimedia subsystem (IMS) services.

In another aspect, a user equipment (UE) in a wireless communication system is provided. The UE includes a radio frequency (RF) unit for transmitting or receiving a radio signal, and a processor coupled to the RF unit and configured to acquire different sets of barring information for a voice application, a video application and other application, decide whether or not access is allowed according to the sets of barring information for the other application if an application except the voice application and the video application is offered.

Access of other applications than voice and video services can be controlled.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
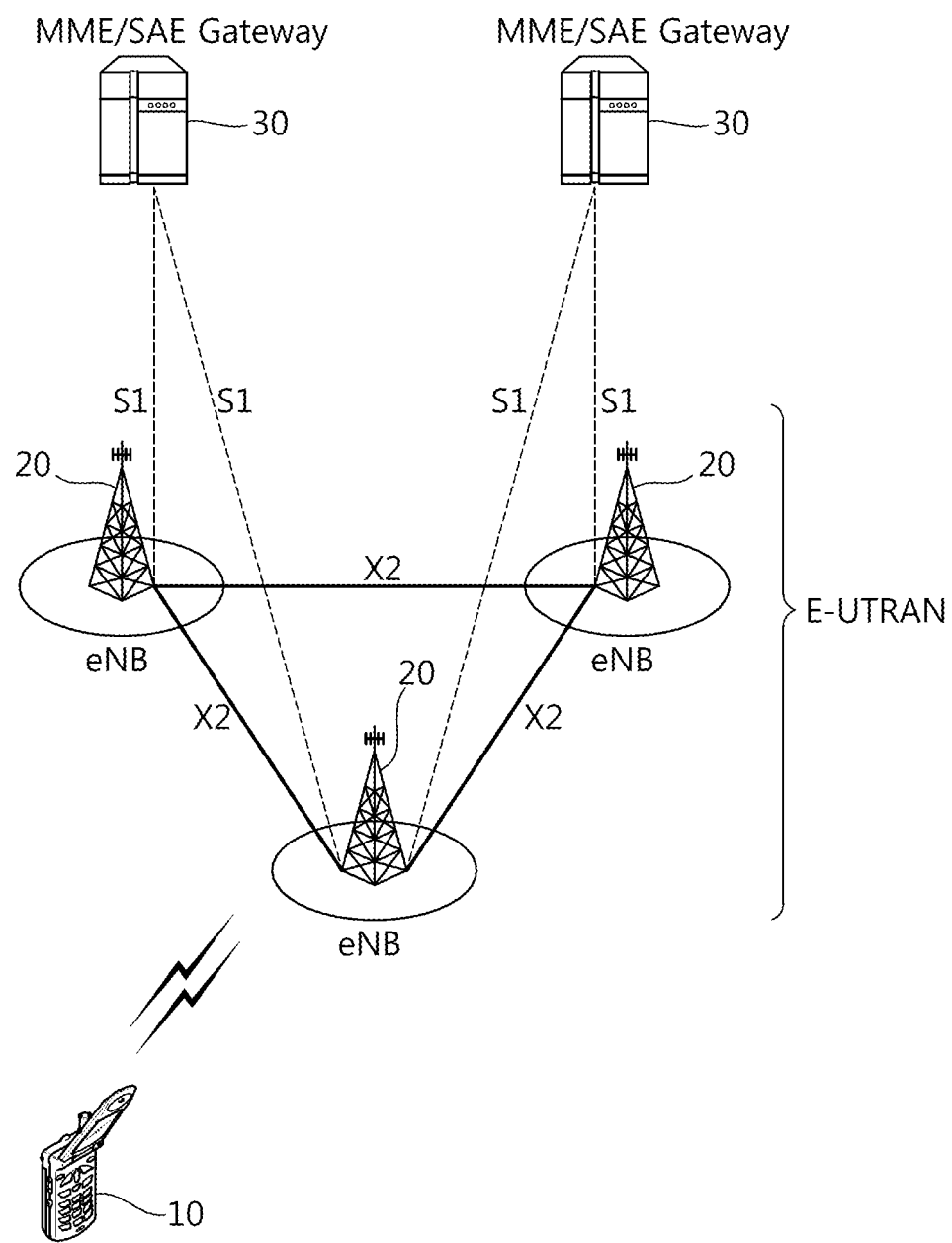
FIG. 1 shows a structure of a wireless communication system.

FIG. 1 shows a structure of a wireless communication system.

The structure of FIG. 1 is an example of a network structure of an evolved-UMTS terrestrial radio access network (E-UTRAN). An E-UTRAN system may be a 3GPP LTE/LTE-A system. An evolved-UMTS terrestrial radio access network (E-UTRAN) includes a user equipment (UE) 10 and a base station (BS) 20 which provides a control plane and a user plane to the UE. The user equipment (UE) 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as an evolved node-B (eNB), a base transceiver system (BTS), an access point, etc. There are one or more cells within the coverage of the BS 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Interfaces for transmitting user traffic or control traffic may be used between the BSs 20. The BSs 20 are interconnected by means of an X2 interface. The BSs 20 are connected to an evolved packet core (EPC) by means of an S1 interface. The EPC may consist of a mobility management entity (MME) 30, a serving gateway (S-GW), and a packet data network (PDN) gateway (PDN-GW). The MME has UE access information or UE capability information, and such information may be primarily used in UE mobility management. The S-GW is a gateway of which an endpoint is an E-UTRAN. The PDN-GW is a gateway of which an endpoint is a PDN. The BSs 20 are connected to the MME 30 by means of an S1-MME, and are connected to the S-GW by means of S1-U. The S1 interface supports a many-to-many relation between the BS 20 and the MME/S-GW 30.

Hereinafter, a downlink (DL) denotes communication from the BS 20 to the UE 10, and an uplink (UL) denotes communication from the UE 10 to the BS 20. In the DL, a transmitter may be a part of the BS 20, and a receiver may be a part of the UE 10. In the UL, the transmitter may be a part of the UE 10, and the receiver may be a part of the BS 20.

Figure 2:
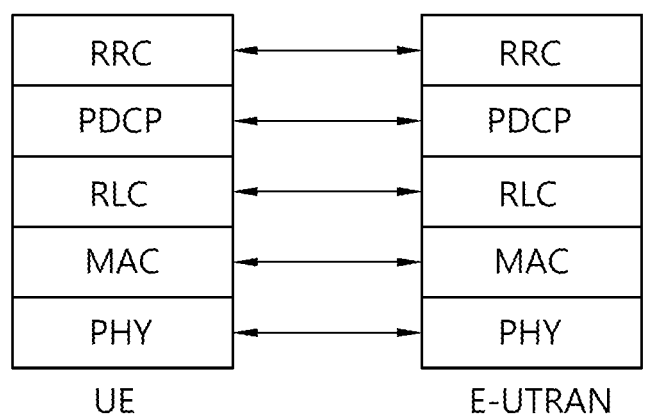
FIG. 2 is a diagram showing radio interface protocol architecture for a control plane.
Figure 3:
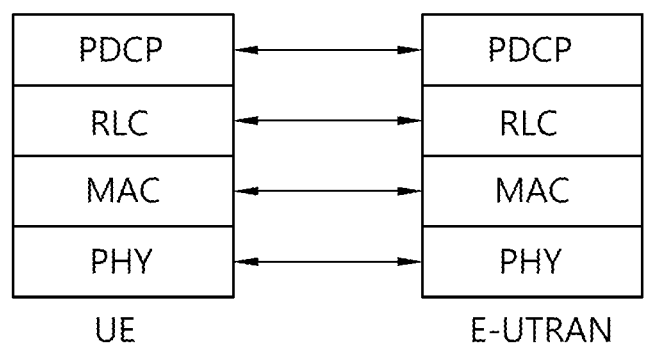
FIG. 3 is a diagram showing radio interface protocol architecture for a user plane.

FIG. 2 is a diagram showing radio interface protocol architecture for a control plane. FIG. 3 is a diagram showing radio interface protocol architecture for a user plane.

Layers of a radio interface protocol between the UE and the E-UTRAN can be classified into a first layer (L1), a second layer (L2), and a third layer (L3) based on the lower three layers of the open system interconnection (OSI) model that is well-known in the communication system. The radio interface protocol between the UE and the E-UTRAN can be horizontally divided into a physical layer, a data link layer, and a network layer, and can be vertically divided into a control plane which is a protocol stack for control signal transmission and a user plane which is a protocol stack for data information transmission. The layers of the radio interface protocol exist in pairs at the UE and the E-UTRAN.

A physical (PHY) layer belonging to the L1 provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface. Between different PHY layers, i.e., a PHY layer of a transmitter and a PHY layer of a receiver, data is transferred through the physical channel. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH can carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ ACK/NACK signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

Figure 4:
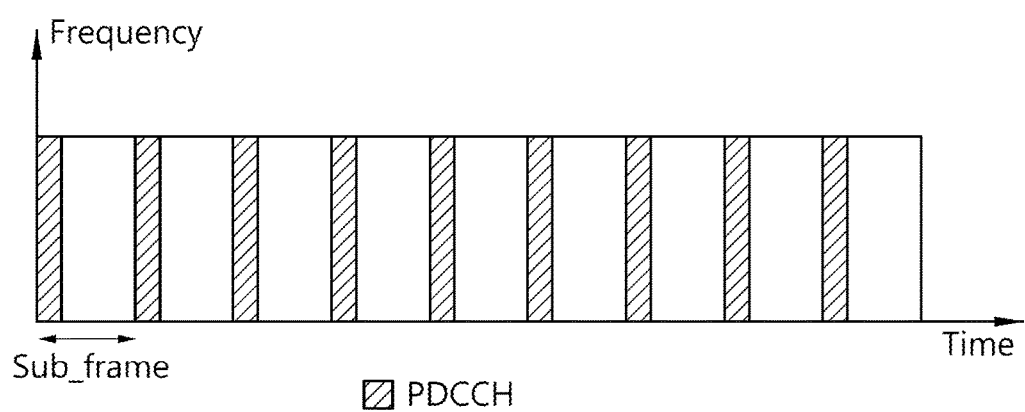
FIG. 4 shows an example of a physical channel structure.

FIG. 4 shows an example of a physical channel structure.

A physical channel consists of a plurality of subframes in a time domain and a plurality of subcarriers in a frequency domain. One subframe consists of a plurality of symbols in the time domain. One subframe consists of a plurality of resource blocks (RBs). One RB consists of a plurality of symbols and a plurality of subcarriers. In addition, each subframe can use specific subcarriers of specific symbols of a corresponding subframe for a PDCCH. For example, a first symbol of the subframe can be used for the PDCCH. A transmission time interval (TTI) which is a unit time for data transmission may be equal to a length of one subframe.

A DL transport channel for transmitting data from the network to the UE includes a broadcast channel (BCH) for transmitting system information, a paging channel (PCH) for transmitting a paging message, a DL-SCH for transmitting user traffic or control signals, etc. The system information carries one or more system information blocks. All system information blocks can be transmitted with the same periodicity. Traffic or control signals of a multimedia broadcast/multicast service (MBMS) are transmitted through a multicast channel (MCH). Meanwhile, a UL transport channel for transmitting data from the UE to the network includes a random access channel (RACH) for transmitting an initial control message, a UL-SCH for transmitting user traffic or control signals, etc.

A MAC layer belonging to the L2 provides a service to a higher layer, i.e., a radio link control (RLC), through a logical channel. A function of the MAC layer includes mapping between the logical channel and the transport channel and multiplexing/de-multiplexing for a transport block provided to a physical channel on a transport channel of a MAC service data unit (SDU) belonging to the logical channel. The logical channel is located above the transport channel, and is mapped to the transport channel. The logical channel can be divided into a control channel for delivering control region information and a traffic channel for delivering user region information. The logical includes a broadcast control channel (BCCH), a paging control channel (PCCH), a common control channel (CCCH), a multicast control channel (MCCH), a multicast traffic channel (MTCH), etc.

An RLC layer belonging to the L2 supports reliable data transmission. A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ). Meanwhile, a function of the RLC layer can be implemented with a functional block inside the MAC layer. In this case, the RLC layer may not exist.

A packet data convergence protocol (PDCP) layer belongs to the L2. A function of a packet data convergence protocol (PDCP) layer in the user plane includes user data delivery, header compression, and ciphering. The header compression has a function for decreasing a size of an IP packet header which contains relatively large-sized and unnecessary control information, to support effective transmission in a radio section having a narrow bandwidth. A function of a PDCP layer in the control plane includes control-plane data delivery and ciphering/integrity protection.

A radio resource control (RRC) layer belonging to the L3 is defined only in the control plane. The RRC layer takes a role of controlling a radio resource between the UE and the network. For this, the UE and the network exchange an RRC message through the RRC layer. The RRC layer serves to control the logical channel, the transport channel, and the physical channel in association with configuration, reconfiguration, and release of RBs. An RB is a logical path provided by the L2 for data delivery between the UE and the network. The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

Handling of service specific access control (SSAC) related parameters is described. It may be referred to Section 5.3.3.10 of 3GPP TS 36.331 V11.0.0 (2012-06).

Upon request from the upper layers, the UE shall:

1> set the local variables BarringFactorForMMTEL-Voice and BarringTimeForMMTEL-Voice as follows:

2> if the UE is in RRC_IDLE and ssac-BarringForMMTEL-Voice is present:

3> if the UE has one or more access classes, as stored on the universal subscriber identification module (USIM), with a value in the range 11 . . . 15, which is valid for the UE, and 3> if, for at least one of these access classes, the corresponding bit in the ac-BarringForSpecialAC contained in ssac-BarringForMMTEL-Voice is set to zero:

4> set BarringFactorForMMTEL-Voice to one and BarringTimeForMMTEL-Voice to zero;

3> else:

4> set BarringFactorForMMTEL-Voice and BarringTimeForMMTEL-Voice to the value of ac-BarringFactor and ac-BarringTime included in ssac-BarringForMMTEL-Voice, respectively;

2> else set BarringFactorForMMTEL-Voice to one and BarringTimeForMMTEL-Voice to zero;

1> set the local variables BarringFactorForMMTEL-Video and BarringTimeForMMTEL-Video as follows:

2> if the UE is in RRC_IDLE and ssac-BarringForMMTEL-Video is present:

3> if the UE has one or more access classes, as stored on the USIM, with a value in the range 11 . . . 15, which is valid for the UE, and 3> if, for at least one of these access classes, the corresponding bit in the ac-BarringForSpecialAC contained in ssac-BarringForMMTEL-Video is set to zero:

4> set BarringFactorForMMTEL-Video to one and BarringTimeForMMTEL-Video to zero;

3> else:

4> set BarringFactorForMMTEL-Video and BarringTimeForMMTEL-Video to the value of ac-BarringFactor and ac-BarringTime included in ssac-BarringForMMTEL-Video, respectively;

2> else set BarringFactorForMMTEL-Video to one and BarringTimeForMMTEL-Video to zero;

1> forward the variables BarringFactorForMMTEL-Voice, BarringTimeForMMTEL-Voice, BarringFactorForMMTEL-Video and BarringTimeForMMTEL-Video to the upper layers;

A system information block type 2 is described. It may be referred to Section 6.3.1 of 3GPP TS 36.331 V11.0.0 (2012-06). Information element (IE) SystemInformationBlockType2 contains radio resource configuration information that is common for all UEs. Table 1 shows an example of the SystemInformationBlockType2 IE.

TABLE 1

```
--.ASN1START
SystemInformationBlockType2 ::= SEQUENCE {
```

TABLE 1-continued

```
    ac-BarringInfo                  SEQUENCE {
        ac-BarringForEmergency              BOOLEAN,
        ac-BarringForMO-Signalling          AC-BarringConfig      OPTIONAL,
-- Need OP
        ac-BarringForMO-Data                AC-BarringConfig      OPTIONAL
-- Need OP
    }                                                             OPTIONAL,
-- Need OP
    RadioResourceConfigCommon       RadioResourceConfigCommonSIB,
    ue-TimersAndConstants           UE-TimersAndConstants,
    freqInfo                        SEQUENCE {
        ul-CarrierFreq                      ARFCN-ValueEUTRA      OPTIONAL,
-- Need OP
        ul-Bandwidth                        ENUMERATED {n6, n15, n25, n50, n75,
n100}
                                                                  OPTIONAL,
-- Need OP
        additionalSpectrumEmission          AdditionalSpectrumEmission
    },
    mbsfn-SubframeConfigList        MBSFN-SubframeConfigList      OPTIONAL,
-- Need OR
    timeAlignmentTimerCommon        TimeAlignmentTimer,
    ...,
    lateNonCriticalExtension        OCTET STRING (CONTAINING
SystemInformationBlockType2-v8h0-IEs)
                                                                  OPTIONAL,
--Need OP
    [[ssac-BarringForMMTEL-Voice-r9     AC-BarringConfig          OPTIONAL,
-- Need OP
        ssac-BarringForMMTEL-Video-r9   AC-BarringConfig          OPTIONAL
-- Need OP
    ]],
    [[ac-BarringForCSFB-r10              AC-BarringConfig         OPTIONAL
-- Need OP
    ]]
}
SystemInformationBlockType2-v8h0-IEs ::= SEQUENCE {
    multiBandInfoList               SEQUENCE (SIZE (1..maxMultiBands)) OF
AdditionalSpectrumEmission
OPTIONAL,         -- Need OR
    nonCriticalExtension    SEQUENCE { }                          OPTIONAL
-- Need OP
}
AC-BarringConfig :: =               SEQUENCE {
    ac-BarringFactor                    ENUMERATED {
                                            p00, p05, p10, p15, p20, p25, p30,
p40,
                                            p50, p60, p70, p75, p80, p85, p90,
p95},
    ac-BarringTime                      ENUMERATED {s4 , s8 , s16, s32 , s64, s128,
s256, s512},
    ac-BarringForSpecialAC              BIT STRING (SIZE(5))
}
MBSFN-SubframeConfigList ::= SEQUENCE (SIZE (1..maxMBSFN-Allocations)) OF
MBSFN-SubframeConfig
-- ASN1STOP
```

Referring to Table 1, the SystemInformationBlockType2 IE includes ssac_BarringForMMTEL-Video field and ssac_BarringForMMTEL-Voie field. The ssac_BarringForMMTEL-Video field indicates service specific access class barring for MMTEL video originating calls. The ssac_BarringForMMTEL-Video field includes barring information for MMTEL-video, which includes a barring factor (ac-BarringFactor) for MMTEL-video and a barring time (ac-BarringTime) for MMTEL-video. The ssac_BarringForMMTEL-Voice field indicates service specific access class barring for MMTEL voice originating calls. The ssac_BarringForMMTEL-Voice field includes barring information for MMTEL-voice, which includes a barring factor (ac-BarringFactor) for MMTEL-voice and a barring time (ac-BarringTime) for MMTEL-voice.

SSAC in multimedia telephony service (MMTEL) layer is described. It may be referred to Annex J of 3GPP TS 24.173 V11.2.0 (2012-03).

The following information is provided by lower layer:
BarringFactorForMMTEL-Voice: barring rate for MMTEL voice;
BarringTimeForMMTEL-Voice: barring timer for MMTEL voice;
BarringFactorForMMTEL-Video: barring rate for MMTEL video; and
BarringTimeForMMTEL-Video: barring timer for MMTEL video.

Upon request from a user to establish an MMTEL communication session, the UE shall:

1) if the MMTEL communication session to be established is an emergency session, then skip the rest of steps below and continue with session establishment;

2) retrieve SSAC related information mentioned above from lower layers;

3) if video is offered in the MMTEL communication session:

A) If back-off timer Tx is running, reject the MMTEL communication session establishment and skip the rest of steps below; or B) else, then:

I) draw a new random number "rand1" that is uniformly distributed in the range 0≤rand1<1; and II) if the random number "rand1" is lower than BarringFactorForMMTEL-Video, then skip the rest of steps below and continue with session establishment;

III) else, then;

i) draw a new random number "rand2" that is uniformly distributed in the range 0≤rand2<1; and ii) start back-off timer Tx with the timer value calculated using the formula:

$$Tx=(0.7+0.6*rand2)*BarringTimeForMMTEL\text{-}Video;$$
and iii) reject the MMTEL communication session establishment and skip the rest of steps below;

4) if audio is offered in the MMTEL communication session:

A) if back-off timer Ty is running, reject the MMTEL communication session establishment and skip the rest of steps below; or B) else, then;

I) draw a new random number "rand3" that is uniformly distributed in the range 0≤rand3<1; and II) if the random number "rand3" is lower than BarringFactorForMMTEL-Voice, then skip the rest of steps below and continue with session establishment;

III) else, then;

i) draw a new random number "rand4" that is uniformly distributed in the range 0≤rand4<1; and ii) start timer Ty with the timer value calculated using the formula:

$$Ty=(0.7+0.6*rand4)*BarringTimeForMMTEL\text{-}Voice;$$
and iii) reject the MMTEL communication session establishment;

The SSAC is not activated when the UE is in other radio accesses (e.g. UTRAN/GSM-EDGE radio access network (GERAN)). And when the UE camping on E-UTRAN moves to other radio accesses (e.g. UTRAN/GERAN), back-off timer (Tx or Ty or both) shall be stopped if running.

According to the description above, SSAC is used to control access attempts for MMTEL-voice and MMTEL-video. The cell broadcasts barring information for the MMTEL-voice and the MMTEL-video via system information on a BCCH. When the UE receives system information, the UE can acquire the barring information for the MMTEL-voice and the MMTEL-video. The barring information includes a barring factor and a barring time. Different sets of barring information are provided for the MMTEL-voice and the MMTEL-video.

If an RRC layer of the UE receives SSAC barring information, the RRC layer of the UE just forwards the received SSAC barring information to the MMTEL layer of the UE. Then, when the UE makes an RRC connection for MMTEL application, the MMTEL layer of the UE decides whether or not to initiate RRC connection establishment based on the SSAC barring information.

However, according to the description above, the SSAC is not applied to other applications than voice and video services. Thus, if operators want to prioritize access for voice calls, operators cannot bar access from non-voice calls, since there is no SSAC for other applications than voice and video applications. Therefore, a method for applying SSAC for other applications than voice and video applications may be proposed.

Figure 5:
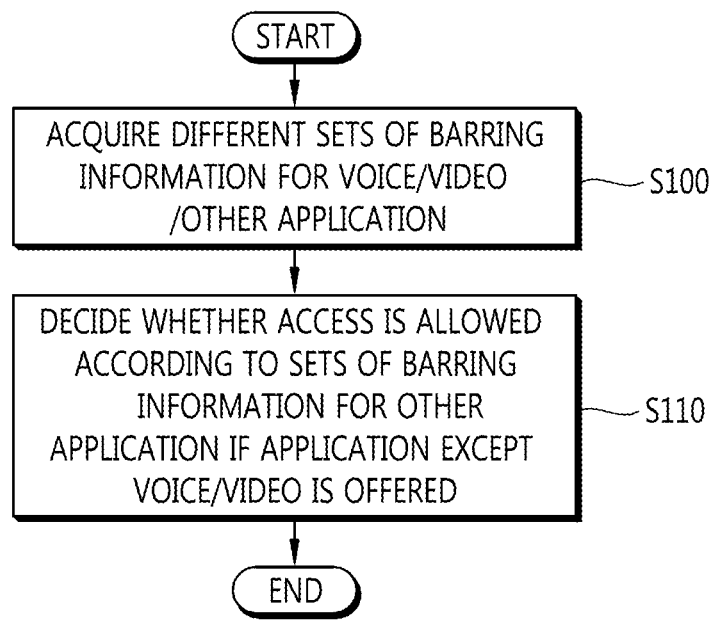
FIG. 5 shows an example of a method for performing service specific access control according to an embodiment of the present invention.

FIG. 5 shows an example of a method for performing service specific access control according to an embodiment of the present invention.

At step S100, the UE acquires different sets of barring information for a voice application, a video application and other application. The different sets of barring information may be acquired at an RRC layer. The different sets of barring information may be acquired via an SIB2 described above in Table 1. The other application may contain at least one of chat communication, text communication, image transfer, file transfer, fax, data. The voice application may correspond to a voice service over long term evolution (VoLTE). In addition, The voice application, the video application and the other application may correspond to IP multimedia subsystem (IMS) services.

The UE forwards the acquired different sets of barring information from an RRC layer to an upper layer than the RRC layer. The upper layer is an MMTEL layer. The UE selects one of the sets of barring information among the different sets of barring information at the upper layer than the RRC layer. At step S110, the UE decides whether or not access is allowed according to the sets of barring information for the other application if an application except the voice application and the video application is offered.

If the UE initiates the session establishment, the MMTEL layer of the UE and a non-access stratum (NAS) layer of the UE request RRC connection establishment to the RRC layer of the UE. Upon request from the MMTEL layer and the NAS layer of the UE, the RRC layer of the UE initiates RRC connection establishment procedure.

If the UE reject the session establishment as a result of SSAC, the MMTEL layer of the UE and the NAS layer of the UE do not request RRC connection establishment to the RRC layer of the UE. Thus, the RRC layer of the UE does not initiate RRC connection establishment procedure.

According to the embodiment of the present invention described in FIG. 5, SSAC for other applications than the voice and video applications can be applied. Therefore, the other applications than the voice and video applications can be barred in an emergency situation.

Details of the embodiment of the present invention in the MMTEL layer and the RRC layer in the UE side are described below.

SSAC in the RRC layer according to the embodiment of the present invention is described.

Upon request from the upper layers, the UE shall:

1> set the local variables BarringFactorForMMTEL-Voice and BarringTimeForMMTEL-Voice as follows:

2> if the UE is in RRC_IDLE and ssac-BarringForMMTEL-Voice is present:

3> if the UE has one or more access classes, as stored on the universal subscriber identification module (USIM), with a value in the range 11 . . . 15, which is valid for the UE, and 3> if, for at least one of these access classes, the corresponding bit in the ac-BarringForSpecialAC contained in ssac-BarringForMMTEL-Voice is set to zero:

4> set BarringFactorForMMTEL-Voice to one and BarringTimeForMMTEL-Voice to zero;

3> else:

4> set BarringFactorForMMTEL-Voice and BarringTimeForMMTEL-Voice to the value of ac-BarringFactor and ac-BarringTime included in ssac-BarringForMMTEL-Voice, respectively;

2> else set BarringFactorForMMTEL-Voice to one and BarringTimeForMMTEL-Voice to zero;
1> set the local variables BarringFactorForMMTEL-Video and BarringTimeForMMTEL-Video as follows:
2> if the UE is in RRC_IDLE and ssac-BarringForMMTEL-Video is present:
3> if the UE has one or more access classes, as stored on the USIM, with a value in the range 11 . . . 15, which is valid for the UE, and
3> if, for at least one of these access classes, the corresponding bit in the ac-BarringForSpecialAC contained in ssac-BarringForMMTEL-Video is set to zero:
4> set BarringFactorForMMTEL-Video to one and BarringTimeForMMTEL-Video to zero;
3> else:
4> set BarringFactorForMMTEL-Video and BarringTimeForMMTEL-Video to the value of ac-BarringFactor and ac-BarringTime included in ssac-BarringForMMTEL-Video, respectively;
2> else set BarringFactorForMMTEL-Video to one and BarringTimeForMMTEL-Video to zero;
1> set the local variables BarringFactorForMMTEL-data and BarringTimeForMMTEL-data as follows:
2> if the UE is in RRC_IDLE (and RRC_CONNECTED) and ssac-BarringForMMTEL-data is present:
3> if the UE has one or more access classes, as stored on the USIM, with a value in the range 11 . . . 15, which is valid for the UE, and
3> for at least one of these access classes, the corresponding bit in the ac-BarringForSpecialAC contained in ssac-BarringForMMTEL-data is set to zero:
4> set BarringFactorForMMTEL-data to one and BarringTimeForMMTEL-data to zero;
3> else:
4> set BarringFactorForMMTEL-data and BarringTimeForMMTEL-data to the value of ac-BarringFactor and ac-BarringTime included in ssac-BarringForMMTEL-data, respectively;
2> else set BarringFactorForMMTEL-Voice to one and BarringTimeForMMTEL-Voice to zero;
1> forward the variables BarringFactorForMMTEL-data, BarringTimeForMMTEL-data, BarringFactorForMMTEL-Voice, BarringTimeForMMTEL-Voice, BarringFactorForMMTEL-Video and BarringTimeForMMTEL-Video to the upper layers;

According to the description above, SSAC in the RRC layer according to the embodiment of the present invention is similar as the SSAC in the RRC layer according to the conventional art, but SSAC for other applications than the voice and video application may be additionally performed by newly defined BarringFactorForMMTEL-data, BarringTimeForMMTEL-data.

The newly defined BarringFactorForMMTEL-data, BarringTimeForMMTEL-data field may be included in the SIB2, like BarringFactorForMMTEL-Voice, BarringTimeForMMTEL-Voice, BarringFactorForMMTEL-Video and BarringTimeForMMTEL-Video field.

Table 2 shows an example of the SystemInformationBlockType2 IE according to the embodiment of the present invention.

TABLE 2

```
-- ASN1START
SystemInformationBlockType2 :: = SEQUENCE {
    ac-BarringInfo                        SEQUENCE {
        ac-BarringForEmergency                    BOOLEAN,
        ac-BarringForMO-Signalling                AC-BarringConfig           OPTIONAL,
-- Need OP
        ac-BarringForMO-Data                      AC-BarringConfig           OPTIONAL
-- Need OP
    }                                                                        OPTIONAL,
-- Need OP
    RadioResourceConfigCommon             RadioResourceConfigCommonSIB,
    ue-TimersAndConstants                 UE-TimersAndConstants,
    freqInfo                              SEQUENCE {
        ul-CarrierFreq                            ARFCN-ValueEUTRA           OPTIONAL,
-- Need OP
        ul-Bandwidth                              ENUMERATED {n6, n15, n25, n50, n75, n100}
                                                                             OPTIONAL,
-- Need OP
        additionalSpectrumEmission                AdditionalSpectrumEmission
    },
    mbsfn-SubframeConfigList              MBSFN-SubframeConfigList           OPTIONAL,
-- Need OR
    timeAlignmentTimerCommon              TimeAlignmentTimer,
    ...,
    lateNonCriticalExtension              OCTET STRING (CONTAINING SystemInformationBlockType2-v8h0-IEs)
                                                                             OPTIONAL,
-- Need OP
    [[ssac-BarringForMMTEL-Voice-r9                AC-BarringConfig           OPTIONAL,
-- Need OP
      ssac-BarringForMMTEL-Video-r9                AC-BarringConfig           OPTIONAL
-- Need OP
      ssac-BarringForMMTEL-data-r9                 AC-BarringConfig
OPTIONAL         -- Need OP
    ]],
    [[ac-BarringForCSFB-r10                        AC-BarringConfig           OPTIONAL
-- Need OP
    ]]
}
SystemInformationBlockType2-v8h0-IEs ::= SEQUENCE {
```

TABLE 2-continued

```
    multiBandInfoList              SEQUENCE (SIZE (1..maxMultiBands)) OF
AdditionalSpectrumEmission
        OPTIONAL,        -- Need OR
    nonCriticalExtension   SEQUENCE { }                              OPTIONAL
-- Need OP
}
AC-BarringConfig ::=             SEQUENCE {
    ac-BarringFactor                ENUMERATED {
                                    p00, p05, p10, p15, p20, p25, p30, p40,
                                    p50, p60, p70, p75, p80, p85, p90, p95},
    ac-BarringTime               ENUMERATED {s4, s8, s16, s32, s64, s128, s256, s512},
    ac-BarringForSpecialAC       BIT STRING (SIZE(5))
}
MBSFN-SubframeConfigList ::= SEQUENCE (SIZE (1..maxMBSFN-Allocations)) OF MBSFN-SubframeConfig
--ASN1STOP
```

Referring to Table 2, the SystemInformationBlockType2 IE includes ssac_BarringForMMTEL-data field additionally. The ssac_BarringForMMTEL-data field indicates service specific access class barring for MMTEL originating calls other than video calls and voice calls. The ssac_BarringForMMTEL-data field includes barring information for MMTEL-data, which includes a barring factor (ac-BarringFactor) for MMTEL-data and a barring time (ac-BarringTime) for MMTEL-data.

SSAC in the MMTEL layer according to the embodiment of the present invention is described.

The following information is provided by lower layer of the UE (i.e. RRC layer of the UE):

BarringFactorForMMTEL-Data: barring rate for MMTEL data;
BarringTimeForMMTEL-Data: barring timer for MMTEL data;
BarringFactorForMMTEL-Voice: barring rate for MMTEL voice;
BarringTimeForMMTEL-Voice: barring timer for MMTEL voice;
BarringFactorForMMTEL-Video: barring rate for MMTEL video; and
BarringTimeForMMTEL-Video: barring timer for MMTEL video.

Upon request from a user to establish an MMTEL communication session, the UE shall:

1) if the MMTEL communication session to be established is an emergency session, then skip the rest of steps below and continue with session establishment;

2) retrieve SSAC related information mentioned above from lower layers (i.e. RRC layer of the UE);

3) if video is offered in the MMTEL communication session:
  A) If back-off timer Tx is running, reject the MMTEL communication session establishment and skip the rest of steps below; or
  B) else, then:
    I) draw a new random number "rand1" that is uniformly distributed in the range 0≤rand1<1; and
    II) if the random number "rand1" is lower than BarringFactorForMMTEL-Video, then skip the rest of steps below and continue with session establishment;
    III) else, then;
    i) draw a new random number "rand2" that is uniformly distributed in the range 0≤rand2<1; and
    ii) start back-off timer Tx with the timer value calculated using the formula:

$Tx=(0.7+0.6*rand2)*BarringTimeForMMTEL\text{-}Video;$
    and iii) reject the MMTEL communication session establishment and skip the rest of steps below;

4) if audio is offered in the MMTEL communication session:
  A) if back-off timer Ty is running, reject the MMTEL communication session establishment and skip the rest of steps below; or
  B) else, then;
    I) draw a new random number "rand3" that is uniformly distributed in the range 0≤rand3<1; and
    II) if the random number "rand3" is lower than BarringFactorForMMTEL-Voice, then skip the rest of steps below and continue with session establishment;
    III) else, then;
    i) draw a new random number "rand4" that is uniformly distributed in the range 0≤rand4<1; and
    ii) start timer Ty with the timer value calculated using the formula:

$Ty=(0.7+0.6*rand4)*BarringTimeForMMTEL\text{-}Voice;$
    and iii) reject the MMTEL communication session establishment;

5) if data or all the other traffic type except video and audio is offered in the MMTEL communication session:
  A) if back-off timer Tz is running, reject the MMTEL communication session establishment and skip the rest of steps below; or
  B) else, then;
    I) draw a new random number "rand5" that is uniformly distributed in the range 0≤rand5<1; and
    II) if the random number "rand5" is lower than BarringFactorForMMTEL-data, then skip the rest of steps below and continue with session establishment;
    III) else, then;
    i) draw a new random number "rand6" that is uniformly distributed in the range 0≤rand6<1; and
    ii) start timer Tz with the timer value calculated using the formula:

$Tz=(0.7+06*rand6)*BarringTimeForMMTEL\text{-}data;$
    and iii) reject the MMTEL communication session establishment;

The SSAC is not activated when the UE is in other radio accesses (e.g. UTRAN/GSM-EDGE radio access network (GERAN)). And when the UE camping on E-UTRAN moves to other radio accesses (e.g. UTRAN/GERAN), back-off timer (Tx or Ty or both) shall be stopped if running.

Figure 6:
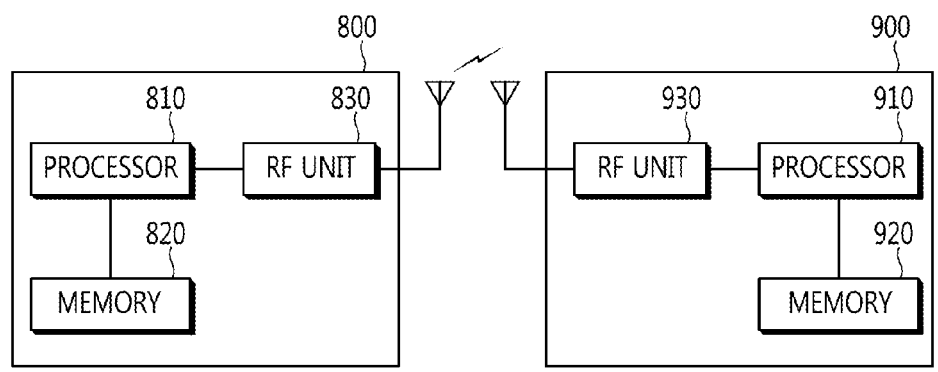
FIG. 6 is a block diagram showing wireless communication system to implement an embodiment of the present invention.

FIG. 6 is a block diagram showing wireless communication system to implement an embodiment of the present invention.

An eNB 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and an RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for performing, by a user equipment (UE), service-specific access control in a wireless communication system, the method comprising:
   acquiring, by a radio access control (RRC) layer of the UE, different sets of service specific access control (SSAC) barring information for a multimedia telephony service (MMTEL) voice application, a MMTEL video application and a MMTEL data application for a non-voice and non-video data,
   wherein the SSAC barring information for the MMTEL data application includes a BarringFactorForMMTEL-data for indicating a barring factor specified for the MMTEL data application and a BarringTimeForMMTEL-data for indicating a barring time specified for the MMTEL data application;
   forwarding, from the RRC layer to an upper layer, the sets of the SSAC barring information including the BarringFactorForMMTEL-data and the BarringTimeForMMTEL-data;
   deciding, by the upper layer, whether or not access is allowed according to the sets of the SSAC barring information when the access is caused by the MMTEL data application other than the MMTEL voice application and the MMTEL video application,
   wherein the decision is performed based on the BarringFactorForMMTEL-data and the BarringTimeForMMTEL-data.

2. The method of claim 1, wherein the upper layer is a MMTEL layer.

3. The method of claim 1 further comprising:
   selecting, by the upper layer, the sets of barring information for another application among the different sets of the SSAC barring information.

4. The method of claim 1, wherein the different sets of barring information are acquired via a system information block type 2 (SIB2).

5. The method of claim 1, wherein the non-voice and non-video data contains at least one of chat communication, text communication, image transfer, file transfer, fax, and data.

6. The method of claim 1, wherein the voice application corresponds to a voice service over long term evolution (VoLTE).

7. The method of claim 1, wherein the MMTEL voice application, the MMTEL video application and the MMTEL data application correspond to IP multimedia subsystem (IMS) services.

8. A user equipment (UE) in a wireless communication system, the UE comprising:
   a radio frequency (RF) unit that transmits and receives a radio signal; and
   a processor coupled to the RF unit, wherein the processor operates a radio access control (RRC) layer and an upper layer above the RRC layer,
   wherein the RRC layer acquires different sets of service specific access control (SSAC) barring information for a multimedia telephony service (MMTEL) voice application, a MMTEL video application and a MMTEL data application for a non-voice and non-video data,
   wherein the SSAC barring information for the MMTEL data application includes a BarringFactorForMMTEL-data for indicating a barring factor specified for the MMTEL data application and a BarringTimeForMMTEL-data for indicating a barring time specified for the MMTEL data application;
   wherein the RRC layer forwards, to the upper layer, the sets of the SSAC barring information including the BarringFactorForMMTEL-data and the BarringTimeForMMTEL-data;
   wherein the upper layer decides whether or not access is allowed according to the sets of the SSAC barring information when the access is caused by the MMTEL data application other than the MMTEL voice application and the MMTEL video application, wherein the decision is performed based on the BarringFactorForMMTEL-data and the BarringTimeForMMTEL-data.

9. The UE of claim 8, wherein the upper layer is a MMTEL layer.

10. The UE of claim 8, wherein the upper layer of the processor further selects the sets of barring information for another application among the different sets of barring information.

11. The UE of claim 8, wherein the different sets of barring information are acquired via a system information block type 2 (SIB2).

* * * * *